July 22, 1958  G. S. BUTTERWORTH ET AL  2,843,974
INCREMENTAL FEED MECHANISMS
Filed March 25, 1957  4 Sheets-Sheet 1

INVENTORS
GREIG S. BUTTERWORTH
EDWARD S. SILVER
BY
ATTORNEYS

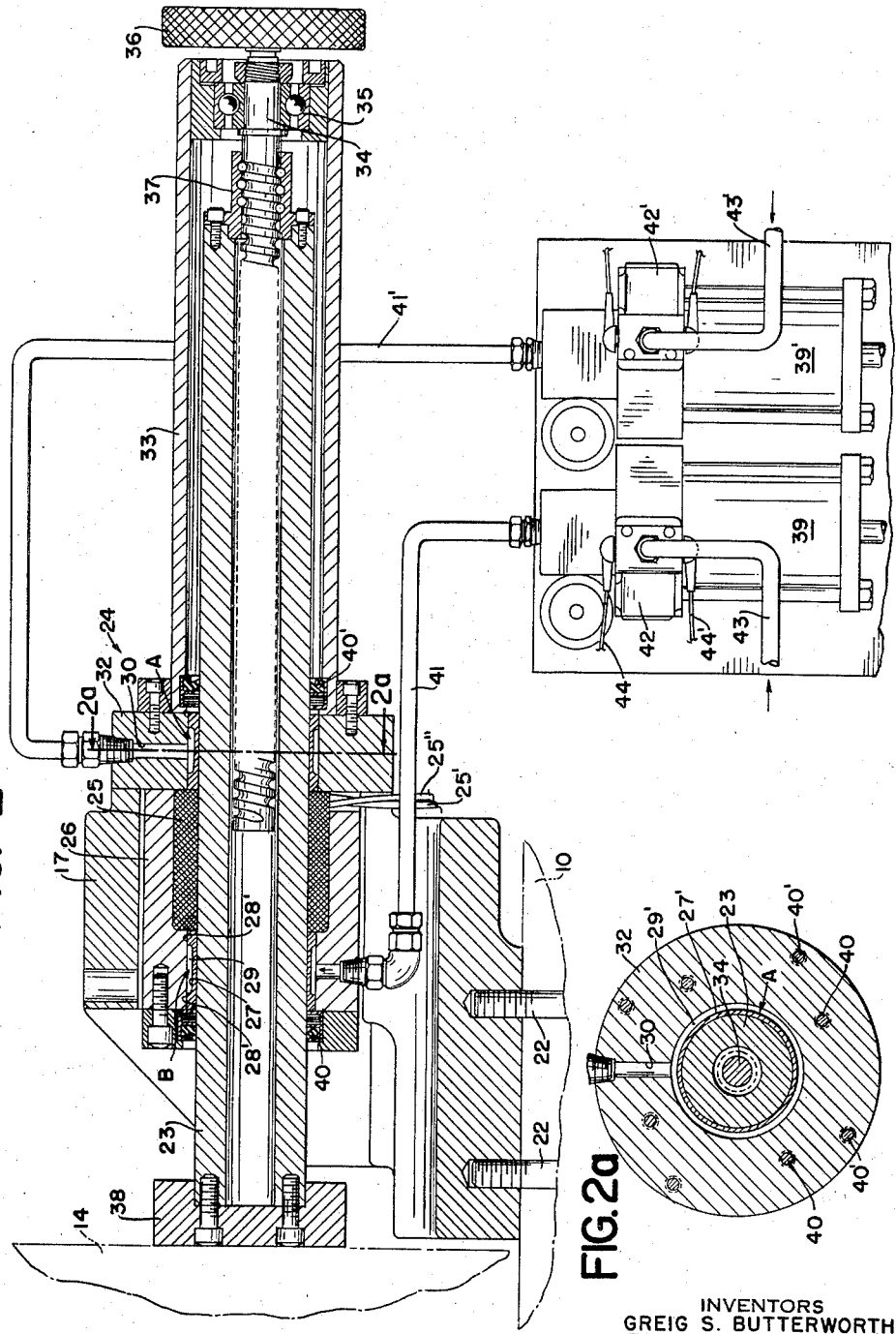

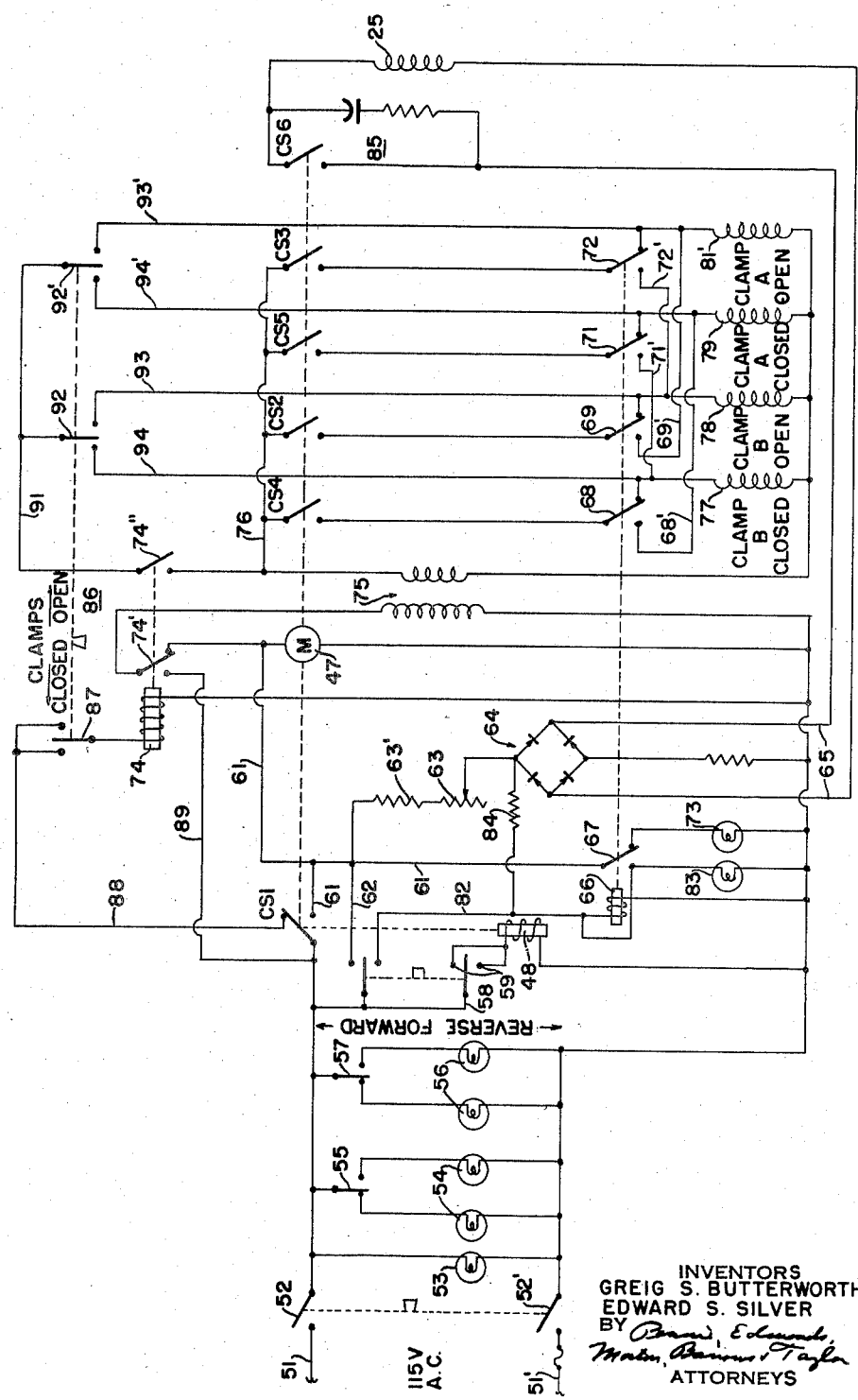

July 22, 1958    G. S. BUTTERWORTH ET AL    2,843,974
INCREMENTAL FEED MECHANISMS Filed March 25, 1957    4 Sheets-Sheet 4

INVENTORS
GREIG S. BUTTERWORTH
EDWARD S. SILVER
BY
ATTORNEYS

United States Patent Office 2,843,974
Patented July 22, 1958

2,843,974

INCREMENTAL FEED MECHANISMS

Greig S. Butterworth, Cincinnati, Ohio, and Edward S. Silver, Brooklyn, N. Y., assignors to Airborne Instruments Laboratory, Inc., Mineola, N. Y., a corporation of Delaware Application March 25, 1957, Serial No. 648,402

8 Claims. (Cl. 51—103)

This invention relates to precision incremental feed mechanisms, particularly mechanisms capable of providing incremental movements in the microinch range.

Incremental feeds, rather than continuous feeds, are often required in many applications. They are particularly useful in machine tools, mechanical and optical instruments, etc., but find general applicability wherever small, precise movement of one member with respect to another is required.

In some applications only light loads are present, that is, only small forces are required to produce the desired movement. Other applications involve heavy loads where large forces must be produced by the feed mechanism. This is often true in the machine tool industry. For example, cutting and grinding tools are often mounted on a heavy carriage which slides on accurate ways formed as part of the machine bed. Static friction as well as sliding friction must be overcome in moving the carriage, and the static friction is commonly considerably higher than the sliding friction. Hence large forces are required. Yet the resultant movement must be accurately controlled if the work product is to be kept to small tolerances.

In such mechanisms it is desirable to have convenient means for producing an increment of movement at any time, in forward or reverse directions, and to be able to adjust the increment or step size at will. It is also desirable to have a coarse feed adjustment for rapid movement of the carriage or other load member close to the desired working position, whereupon the incremental movement may be used for subsequent fine adjustment. In such case it is important to combine the coarse and incremental feed mechanisms in such manner as to minimize displacements arising in changing over from coarse feed to fine. It is also important to provide simple and effective changeover means.

There has previously been proposed an incremental feed mechanism comprising a rod or bar of magnetostrictive material with an encircling coil which, upon energization, changes the length of the rod or bar by minute amounts. A pair of clamps of the magnetic chuck type are employed, arranged at each end of the rod or bar, and energized in sequence with the coil actuation so as to produce an inching action.

In the embodiments described hereinafter an incremental feed mechanism is described which functions in a similar manner, but is especially designed to provide movements capable of precise control without extraneous deflections or distortions which would impair the accuracy and reproducibility of the movements, and capable of moving relatively heavy masses by minute amounts, for example of the order of 10–100 microinches. The driving mechanism and clamping mechanisms are arranged so that application of driving and clamping forces does not produce distortion of the members or deflection other than along the desired direction of travel. To this end, both the driving mechanism and the clamping mechanisms are made substantially symmetrical about a common axis, and the forces applied to the clamping mechanisms are made substantially symmetrical about the axis.

These features are described and claimed in a copending application of Lawrence J. Kamm for "Incremental Feed Mechanisms."

In accordance with the present invention, means are also provided for coarse adjustment of the driving member of the incremental feed mechanism, and the clamps forming part of the incremental feed mechanism are employed to maintain the coarse adjustment once set, until the incremental feed mechanism is actuated. A reversible feed mechanism is employed so that the incremental feed can proceed without requiring de-clutching, etc. of the coarse feed mechanism when changing over to fine feed.

An important feature of the present invention is the arrangement of the coarse feed mechanism substantially coaxially with the incremental feed mechanism in order that actuation of the coarse feed will not tend to produce lateral forces or twisting moments with respect to the incremental feed mechanism. Thus, when the clamps of the incremental feed mechanism are closed after the coarse feed adjustment has been made, disturbances in that adjustment are substantially avoided. This is particularly important when heavy loads are to be moved, since even though the parts of the feed mechanism are heavy and massive, when movements of the order of microinches are contemplated any deflection, bending or movement of the incremental feed mechanism other than in its desired direction of travel may substantially impair the operation.

The use of magnetostrictive material with an actuating coil to produce the driving force, and fluid-pressure operated clamps, has been found satisfactory in practice. However, such driving and clamping mechanisms are not essential, and other types of mechanisms may be employed if desired.

In the specific embodiments described hereinafter, the use of the incremental and coarse feed mechanism with a centerless grinder is described. It will be understood that this is for clarity of presentation, and that the mechanism may be used in many other applications.

The invention will be more fully understood by reference to the drawings which illustrate a specific embodiment thereof taken in conjunction with the following description.

In the drawings:

Fig. 2 is a cross-section taken along the axis of an incremental and coarse feed mechanism of the invention with magnetostrictive drive and fluid-pressure operated clamps;

Fig. 2(a) is a cross-section taken along the line 2a—2a of Fig. 2;

Fig. 4 is a circuit diagram of a suitable control unit for the mechanism of Fig. 2;

Figure 1:
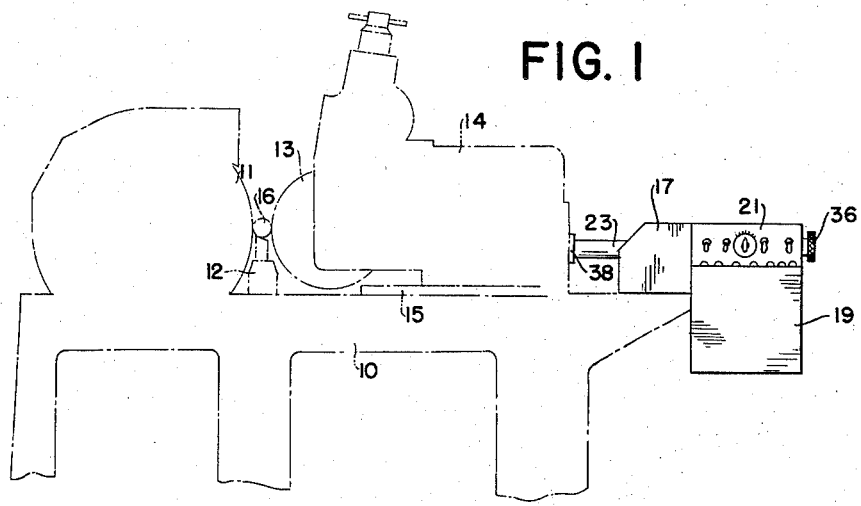
Fig. 1 is an elevation of a centerless grinder in phantom, with one embodiment of an incremental and coarse feed mechanism in accordance with the invention.

Referring to Fig. 1, a centerless grinder is shown in phantom comprising a machine bed 10, a grinding wheel 11, a work rest 12, and a regulator wheel 13 mounted on a sliding carriage 14. The carriage 14 is arranged to slide in ways 15 forming part of the machine bed 10.

This is an illustration of a so-called "through-feed" centerless grinder in which the workpiece 16 is supported on the work rest 12 and the carriage 14 moves forward so that the regulator wheel 13 presses the workpiece against the grinding wheel 11. The movement of the carriage 14 is controlled so that parts of the desired finished size are produced.

Such grinders are commonly used to make finished parts of very precise dimensions, tolerances of one or two ten-thousandths of an inch being fairly common, and even closer tolerances being sometimes specified. Accurate control of the carriage 14 is important to secure precision. This is true not only in the grinding of a given workpiece, but also the position of the carriage must be altered as subsequent workpieces are ground to compensate for wear of the grinding wheel 11, etc.

In order to move the carriage 14 by desired small steps, an incremental feed mechanism is provided comprising a relatively massive support member 17, a driving member 23, and a cabinet 19 containing various components of the feed mechanism. Suitable control switches and indicating lights are mounted on panel 21.

Fig. 2 shows the structure of the incremental feed mechanism, and associated air and hydraulic equipment used to actuate the clamps. The incremental feed mechanism comprises an inner member 23 and an outer member 24 encircling the inner member, the two members being relatively movable in the axial direction. In this embodiment, the outer member is stationary and the inner member moves to drive the load. To this end annular member 32 forming part of the outer member 24 is bolted to the support casting 17 (see Fig. 2a), and the support casting is firmly attached to the machine bed 10 by bolts 22.

The inner member 23 here takes the form of a heavy walled cylindrical tube of magnetostrictive material, such as nickel. The outer member 24 comprises a coil 25 and a pair of fluid-pressure operated clamps A and B. These are rotationally symmetrical about the axis of the inner member 23. Coil 25 is mounted in a heavy steel cylindrical member 26 and clamp B is formed by a metal (advantageously steel) cylindrical diaphragm section 27 having thicker end sections 28, 28' which are silver-soldered or otherwise rigidly secured to member 26. When fluid under pressure is supplied to the chamber 29 through conduit 31, the intermediate diaphragm section 27 is pressed against the inner member 23 and clamps the members firmly together.

Clamp A is formed of a similar metal diaphragm section rigidly secured at its ends to an annular heavy steel member 32 which is bolted or otherwise firmly attached to membr 26 (see Fig. 2a). Fluid pressure is admitted to clamp A through conduit 30.

The clamp structure shown has important advantages. By employing a metal diaphragm rigidly secured at its ends to the outer member 24, the diaphragm is prevented from moving in the axial direction (relative to the outer member), and when the clamp is closed about the inner member 23 axial movement between inner and outer members is strongly resisted. The diaphragm is sufficiently resilient, however, in the direction normal to the opposed surface of the inner member, so that the applied fluid pressure presses the diaphragm firmly around the inner member. Only a small clearance is required when the clamp is open, so that the required diaphragm movement is small.

In addition, the forces applied to the diaphragm in clamping are symmetrical about the axis of inner member 23, and substantially normal to the surface of member 23 engaged by the respective clamp. Hence there is no resultant force tending to bend or twist the inner member 23, or the outer member 24.

An elongated housing 33 is rigidly attached to annular member 32 and supports, at its outer end, the end 34 of a ball screw. This end is mounted in suitable bearings 35 and can be turned by the knurled knob 36. The ball screw cooperates with a ball nut 37 which is rigidly affixed to the outer end of the inner member 23.

The ball screw is symmetrically arranged with respect to the axis of inner member 23. Thus when knob 36 is turned, the translational force produced on nut 37 acts substantially along the axis of the inner member, and is substantially coaxial with the driving force produced by the magnetostriction coil. When the clamps A and B are open the ball screw mechanism provides a coarse feed for carriage 14. Then, by closing either clamp A or B, or both, further axial movement is restrained. The closing of the clamps places the incremental feed mechanism in condition for operation, as will be described in detail hereinafter. It will be noticed that since the coarse feed acts substantially along the same axis as the incremental feed, it does not tend to produce a substantial lateral or tilting action. Thus when the clamps are closed the adjustment made by the coarse feed mechanism is substantially unchanged.

The ball screw is a reversible feed mechanism, that is, application of force to either member will cause movement of the other. As applied to the ball screw illustrated, if the screw is rotated by knob 36, it produces a translation of ball nut 37. On the other hand, translation of nut 37 will produce rotation of the screw. In effect, the driving and driven functions are interchangeable. Hence, when the incremental feed is in operation, and the inner member 23 moves in the axial direction, the reversibility characteristic allows the axial movement to proceed substantially unimpeded by the coarse feed mechanism. It is therefore unnecessary to provide special declutching or other means for disengaging the coarse feed mechanism when changing over to fine feed. If desired for a particular application, the structure could be modified so that the knob rotates the ball nut, rather than the ball screw.

Oil seals 40, 40' are provided to keep the surface of inner member 23 engaged by the clamps free of dirt, metal particles, etc. which would impair the clamping action.

Fig. 2a is a cross-section through clamp A. The intermediate section of the clamp diaphragm 27' is shown encircling the inner member 23 and the fluid pressure chamber 29' lies behind the diaphragm. Screws 40 firmly attach annular member 32 to cylindrical member 26, and screws 40' firmly attach the annular disc to the housing 17 (Fig. 2).

In the embodiment here shown, the clamps are operated hydraulically by suitable hydraulic boosters 39, 39' which are of conventional construction and need not be described in detail. Briefly, each booster has a fluid chamber leading to the corresponding outlet pipe 41, 41' and a piston is arranged in the chamber to create the desired hydraulic pressure. Each hydraulic system is closed, and suitable bleeders may be provided to eliminate air from the systems in initial setup.

As here shown, the hydraulic piston in the booster is air-operated. That is, the hydraulic piston is attached to an air piston of larger diameter, and compressed air is admitted to one side or the other of the air piston so as to apply and remove hydraulic pressure in the clamps. The compressed air is admitted to the boosters under the control of suitable electrically operated air valves 42, 42' which are of conventional construction and need not be described in detail. Briefly, air valve 42 has a slider which opens one or the other of two ports leading to the hydraulic booster. Compressed air from inlet pipe 43 is thus furnished to one or the other sides of the air-operated piston in the hydraulic booster under the control of the slide valve in 42. The position of the slide valve is controlled by two solenoids supplied with electric current through connections 44, 44'. The overall operation is that actuation of one or the other solenoid in the air valve 42 controls the operation of hydraulic booster 39 and applies or removes hydraulic pressure from clamp B. When the slide in the air valve is moved to one position, it is maintained in that position until the other solenoid is energized to move it to the other position. Air valve 42' and hydraulic booster 39' operate similarly to actuate clamp A. While this arrangement has been found satisfactory in practice, other mechanisms may be provided for applying and removing pressure in the clamps, and pneumatic fluid pressure rather than hydraulic may be used in the clamps, if desired.

When current is supplied to coil 25 through leads 25', 25", the portion of the inner magnetostrictive member 23 in the region of the coil changes in length (assuming that one or both clamps A, B are open). In the case of nickel, when the coil is energized the tube 23 is contracted by an amount depending upon the properties of the material, the length and cross-section of the tube through which magnetic flux flows, the magnetic field strength, the applied load, etc. There are other magnetostrictive materials which expand rather than contract in the presence of a magnetic field, and such may be used if desired. Nickel is preferred at the present time since it has a comparatively large coefficient of change of length for a given magnetic field, and more satisfactory mechanical properties.

In a given application, the size of the magnetostriction motor is determined largely by the desired maximum step size and the load force which must be overcome. With a given magnetostrictive force, an increase in the load will reduce the step size, due to compression in the parts of the feed mechanism. By increasing the cross-sectional area of the magnetostrictive tube and the effective length through which magnetic flux flows, a larger step size may be obtained for a given load, or a given step size for larger loads. The number of turns and current in the coil may be selected to produce magnetic saturation for maximum step sizes. Then, by reducing the current, smaller step sizes may readily be obtained. If for a given application the load increases, the current in the coil may be increased to maintain the step size substantially constant, within the range for which the feed mechandism is designed.

In one embodiment which has been successfully operated, in which the coil length was 4 inches and the cross-sectional area of the magnetostrictive tube about 5 square inches, a maximum step under light loads of the order of 100 microinches, and a maximum step of about 90 microinches under a 120 pound load, were obtained. Smaller step sizes could be obtained for increasing loads up to the order of 900 pounds.

Figure 3:
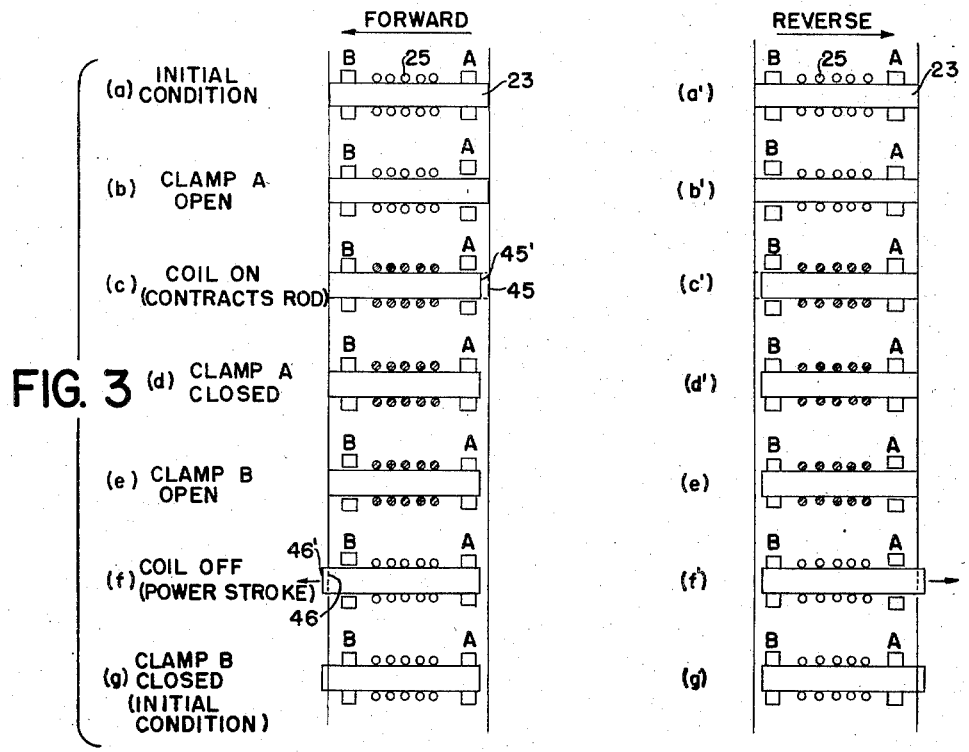
Fig. 3 shows the cycling sequence for forward and reverse feeds.

The sequence of energization of coil and clamps to produce a single incremental movement is shown in Fig. 3. Two columns are shown, one for forward and one for reverse directions. For ease of understanding the inner member 23 is shown as a simple rectangle and clamps A and B are shown as simple rectangles either in contact with 23 (closed) or out of contact (open). When the circles of coil 25 are solid, current is flowing in the coil.

Considering the sequence for a forward step, initially both clamps are closed to hold the load, and the coil is unenergized. Clamp A is then opened (b) and then the coil turned on (c). This contracts the rod 23, as shown by the difference between the dotted initial position 45 and the contracted position 45'. Clamp B is still closed to hold the load. Clamp A is then reclosed (d), clamp B is opened (e) and then coil current turned off (f). This permits the rod 23 to elongate to its original length but, since clamp A is closed, the right end of the rod is fixed in position and the left end moves forward. This is the power stroke, as shown by the difference between the dotted initial position 46 and the final position 46'. Clamp B is then reclosed (g), thereby returning to the initial condition (a). It will thus be seen that this sequence results in a small incremental movement or step of the left end of the inner member 23, and a corresponding movement forward of the carriage 14 (Fig. 1). By repeating the cycle, additional steps take place.

If it is desired to retract the carriage, the reverse sequence shown in Fig. 3 may be employed. Here the coil sequence is the same, but the opening of the clamps A and B is interchanged. A resulting power stroke to the right is obtained as shown at f'.

Figure 5:
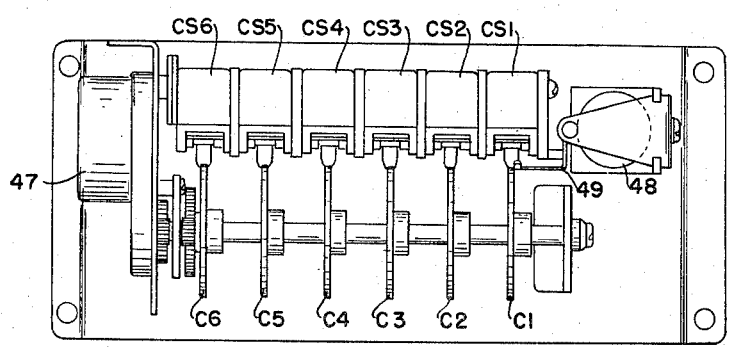
Fig. 5 is a plan view of a cam-operated switch mechanism employed in the control unit.

The sequence shown in Fig. 3 may be produced in any desired manner. One mechanism which has been employed with success is a single-cycle cam timer of conventional construction. Such a timer is shown in Fig. 5, in simplified form. As used in this specific embodiment, six cams designated C1–C6 are mounted on a single shaft driven by motor 47 through a suitable reduction gear assembly. Corresponding switches CS1–CS6 have their contact lever arms moved by the cam surfaces. The cams are here shown as having single discs, but in practice two discs are commonly employed for each cam, with provision for angularly adjusting the discs to alter the intervals in which the corresponding switch is open and closed.

The first cam C1 and corresponding switch CS1 is associated with the control of motor 47 so as to secure single cycle operation. A relay 48 is provided which, when actuated, turns a lever arm 49 so as to close switch CS1 and energize the motor 47. As soon as the motor starts, the switch lever arm moves out of a notch in cam CS1 and the cam maintains the switch closed until it has made one full revolution. Then the lever arm of CS1 drops back into the notch and opens the motor circuit. Thus only a momentary actuation of relay 48 is required to initiate the cycle, and cam C1 with its associated switch insures that the cams will go through one full revolution before stopping. Additional mechanical stop and release means are often employed. Another cycle may, of course, be initiated by again energizing relay 48. The construction of such cam timers is well known and further detail is unnecessary.

Fig. 4 shows a circuit which is suitable for actuating the incremental feed mechanism of Fig. 2 in accordance with the sequence shown in Fig. 3. Power is obtained from the A.-C. power lines at the input lines 51, 51' through a switch 52, 52'. A lamp 53 indicates when power is on. Lamps 54 are lighted alternatively by switch 55 which is actuated by hydraulic booster 39' so as to indicate when clamp A is on and off. Lamps 56 are similarly lighted alternatively by switch 57 under the control of hydraulic booster 39 to indicate when clamp B is on and off.

A double pole, double throw switch 58 is provided in order to step the mechanism in the forward or reverse directions. For manual control the switch 58 is advantageously biased to the neutral position, as shown. Upon throwing switch 58 to either the upper or lower positions, one or the other of the lower contacts 59 supplies power to the motor relay 48. This actuates switch CS1, as explained in connection with Fig. 5, and the corresponding switch arm moves to its lower position to supply power through line 61 to the motor 47. The switch arms of the cam operated switches CS1–CS6 are connected by dotted lines with motor 47 to indicate that their opening and closing is controlled by the motor.

The upper contacts of switch 58 determine whether the sequence is in the forward or reverse direction. The forward direction will be described first. This corresponds to the upper position of switch 58 and power is supplied through the upper contact to line 62 and thence through resistors 63, 63' to a bridge-type rectifier 64. The rectifier supplies actuating current through lines 65 to the coil 25 in the feed mechanism (Fig. 2), under the control of cam-operated switch CS6. A reverse relay 66 is provided and has simultaneously actuated arms 67, 68, 69, 71 and 72. The positions shown correspond to the forward direction and, when switch 58 is moved to its upper position, power is supplied from line 62 through switch arm 67 to the indicator lamp 73.

Relay 74 is also provided so as to permit opening and closing the clamp manually, as will be described hereinafter. In the position shown, when motor 47 is energized through line 61, power is also supplied through switch arm 74′ to the primary of transformer 75. This transformer is here employed to provide a low A.-C. voltage, since the solenoids of the air-operated switches are designed for low voltage operation. The secondary of transformer 75 supplies operating voltage through line 76 to the switch arms of the cam-operated switches CS2–CS5 which control the energization of the solenoids in the air valves 42, 42′ (Fig. 2).

When cam-operated switch CS4 closes, power is supplied through switch arm 68 to the solenoid 77 and moves the air valve 42 to the position which applies hydraulic pressure to clamp B, and consequently closes clamp B. Similarly, closure of switch CS2 applies current to solenoid 78 which opens clamp B. Closure of switch CS5 energizes solenoid 79 which is in the air valve 42′, and applies hydraulic pressure to clamp A so as to close that clamp. Closure of switch CS3 energizes solenoid 81 and opens clamp A.

Figure 6:
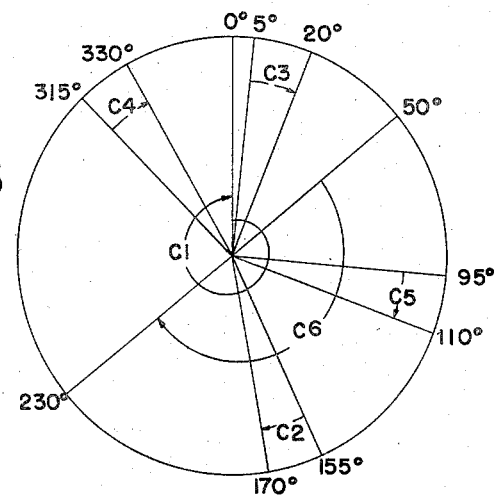
Fig. 6 is an exemplary timing diagram for the cam mechanism of Fig. 5.

The sequence of operation of the cams will be better understood by reference to the cam-timing diagram shown in Fig. 6, considered together with the circuit diagram of Fig. 4. The corresponding conditions shown in Fig. 3 will be indicated in parentheses.

It will be recalled that the operation of the air valves as described in connection with Fig. 2 is such that when a given valve has been moved to one position by one of its solenoids, the valve will stay in that position until its other solenoid is actuated. For this reason, the closures of the circuits by the cams, as shown in Fig. 6, are less than the intervals during which the corresponding air valves remain in given positions.

In Fig. 6, the initial position is shown at zero degrees. Upon actuation of relay 48, the cycle is commenced and the cams make one full revolution, as shown by the arrow designated C1. For this initial zero position, the coil current is off, and clamps A and B are closed due to previous actuation (Fig. 3a). After 5° rotation, cam C3 closes the corresponding microswitch CS3 and opens clamp A (Fig. 3b). After 20° switch CS3 opens, but the clamp A remains open since the air valve does not change its position until positively energized to the opposite position. At 50° rotation cam C6 closes switch CS6 and energizes the magnetostriction coil 25 (Fig. 3c). At 95° cam C5 closes switch CS5 and closes clamp A (Fig. 3d). At 155° cam C2 closes its switch CS2 and opens clamp B (Fig. 3e). At 230° cam C6 opens switch CS6 and cuts off current to the magnetostriction coil 25 (Fig. 3f). This gives the power stroke in the forward direction. At 315° cam C4 closes switch CS4 and closes clamp B (Fig. 3g). Thus, when the cam mechanism reaches its zero position, the current in coil 25 is off and clamps A and B are closed.

Returning to Fig. 4, if it is desired to step in the reverse direction the switch 58 is moved to its lower position, thus supplying power through line 82 to the reverse relay 66. This moves switch arms 67—69, 71, 72 to the left and energizes indicating lamp 83. With switch arms 68, 69, 71 and 72 in their left positions, it will be seen that the interconnections 68′, 69′, 71′ and 72′ now cause cam switches CS4 and CS2 to control the closing and opening of clamp A instead of clamp B. Similarly, switches CS5 and CS3 control the closing and opening of clamp B rather than clamp A. From Fig. 3 it will be seen that this causes the mechanism to feed in the reverse direction.

Variable resistor 63 is provided to change the amount of current supplied to the magnetostriction coil 25, thereby changing the step size. In some cases it is found that in a given application the step size in the forward direction is somewhat different from the step size in the reverse direction. In such case rheostat 63 can be readjusted. If it is desired to equalize the steps in the two directions without altering the setting of rheostat 63, an additional resistor 84 may be provided so that the current through coil 25 is changed by the proper amount when the forward-reverse switch 58 is operated, so as to maintain the step sizes more nearly the same. Other means for automatically changing the current for forward and reverse steps may be provided, if desired.

A resistor and condenser circuit 85 is shunted across switch CS6 to avoid excessive sparking at the switch contacts when current to magnetostriction coil 25 is cut off.

In operation, it is often desired to move carriage 14 by the coarse feed mechanism provided by the ball screw and knurled knob 36, as shown in Fig. 2. In order to do this, it is necessary to open both clamps A and B so that the inner member 23 can slide freely through the outer member 24. In Fig. 4 suitable switching is provided to open the clamps. To this end a switch 86 is provided, having three simultaneously actuated switch arms. This switch is advantageously biased to a neutral position, as shown. Switch arm 87, when moved to either the open or closed position, closes a circuit from relay 74 to line 88. If the cam motor 47 is running, the arm of switch CS1 is in its lower position so that relay 74 cannot be energized. This prevents operation of switch 86 from interrupting a stepping sequence once the sequence has begun.

However, when motor 47 is not running, the arm of switch CS1 is in its upper position as shown, and power is supplied through line 88 to the relay 74. This moves switch arms 74′ and 74″ to the left. Switch arm 74′ therefore supplies power from line 89 to the transformer 75. Movement of arm 74″ to the left supplies the voltage across the secondary of transformer 75 to the line 91 which is connected to switch arms 92, 92′. If these arms are moved to the right, to open the clamps, power is supplied through lines 93, 93′ to solenoids 78 and 81 which open the clamps B and A, respectively. On the other hand, if switch 86 is moved to the left, switch arms 92, 92′ supply power to lines 94, 94′ which energize corresponding solenoids 77 and 79 and close the clamps.

A typical operating procedure will be described as an example of how the various switches may be used in practice. Assume that the centerless grinder of Fig. 1 is to be adjusted to grind a new workpiece 16, and that the carriage 14 is retracted. Switch 86 is moved to the right to its "clamps-open" position. Solenoids 78 and 81 will be energized to move the corresponding air valves to their open positions, thus reducing the pressure in hydraulic lines 41, 41′ and opening clamps B and A. Then the carriage may be fed forward to the workpiece by turning knob 36 to rotate the ball screw. When the coarse adjustment has been made, switch 86 is moved to the left to its "clamps-closed" position, thus closing both clamps A and B. If an incremental feed in the forward direction is then desired, switch 58 is moved momentarily to its upper position and the cam mechanism goes through its forward sequence and makes one step. If additional increments in the forward direction are desired, the switch 58 may be repeatedly closed, or, alternatively, may be held in the upper position to cause repeated steps, as desired. If at any time during operation, one or more incremental steps in the reverse direction are desired, switch 58 is moved to its lower position either successively or held until the desired number of steps have been taken.

In the specific embodiment shown in Fig. 2, the outer member is stationary and the inner member moves. If desired, the inner member may be held stationary and the outer member moved to drive the load. In the specific embodiment, the inner member is of magnetostrictive material and the spacing between clamps A and B in the outer member is maintained fixed. It is also possible to incorporate a cylindrical section of magnetostrictive material in the outer member between the clamps, and make the inner member of steel or other suitable metal. In such case the coil 25 will be arranged to produce flux in the magnetostrictive section of the outer member so as to change the separation of clamps A and B. The clamp diaphragms 27 will be rigidly affixed at their ends to the corresponding end sections of the outer member, and hence strongly resist axial movement relative to the end sections, although the actual separation of the two clamps will change by incremental amounts during the stepping sequence. The clamps could also be formed as part of the inner member, and engage surfaces of the outer member if desired.

In any of these modifications, as well as in the specific embodiment of Fig. 2, it will be understood that actuation of the magnetostrictive coil in the stepping sequence causes an incremental relative change of the surface elements engaged by the clamps. In Fig. 2, for example, when clamp A is open and the coil energized, the surface elements of inner member 23 opposed to clamp A change due to the contraction of the inner member in the axial direction. Similarly, if the spacing between clamps A and B were changed by incorporating a section of magnetostrictive material in the outer member, the surface elements of the inner member opposed to the clamps would be changed. The proper sequencing of clamps and coil for any given arrangement will be understood from the description of the specific embodiment here given.

In these modifications, the detailed arrangement of the coarse feed mechanism may, of course, be suited to the requirements of the particular application.

Instead of employing magnetostriction to produce the axial driving force, other means may be employed if desired. In such case it is advantageous to arrange the driving and coarse feed mechanisms so that the forces are produced substantially along the axis of the driven member.

In the specific embodiments described herein the driving mechanism and the clamping mechanisms are rotationally symmetrical, since they are essentially circular in cross-section. This is preferred at the present time. However, it is possible to use other than rotationally symmetrical mechanisms if desired for a particular application. In such cases it is advantageous, in accordance with the present invention, to make the mechanisms axially symmetrical. That is, portions of the mechanism on one side of the axis should have balancing counterparts on the other side of the axis. Then the coarse feed mechanism is advantageously arranged to act substantially along that axis.

The invention has been described in connection with specific embodiments thereof, and several alternative structures have been mentioned. It will be understood that many changes in the design of the coarse feed mechanism, and its relationship to the driving and clamping mechanisms, may be made within the spirit and scope of the invention. Although a specific control circuit has been described for completeness of disclosure, it will be understood that many different circuits and sequencing arrangements may be employed if desired.

We claim:

1. A precision incremental feed mechanism which comprises an elongated inner member, an outer member disposed about said inner member and relatively movable in the axial direction with respect to said inner member, a plurality of axially-spaced clamps each mounted on one of said members and releasably actuable to engage the other of said members in clamping relationship, displacement means for producing an incremental relative axial change of the surface elements opposed to said clamps, means for actuating said clamps and displacement means in sequence to produce an incremental relative axial movement between said inner and outer members, and a reversible coarse feed mechanism having driving and driven members connected to said inner and outer members to produce relative axial movement therebetween.

2. A precision incremental feed mechanism which comprises an elongated inner member, an outer member disposed about said inner member and relatively movable in the axial direction with respect to said inner member, a plurality of axially-spaced clamps each mounted on one of said members and releasably actuable to engage the other of said member in clamping relationship, displacement means for producing an incremental relative axial change of the surface elements opposed to said clamps, means for actuating said clamps and displacement means in sequence to produce an incremental relative axial movement between said inner and outer members, and a reversible coarse feed mechanism having driving and driven members connected to said inner and outer members to produce relative axial movement therebetween, said coarse feed mechanism being positioned to produce a driving force acting substantially along the axis of said inner member.

3. A precision incremental feed mechanism which comprises relatively movable inner and outer members, said outer member being disposed about said inner member and the contacting surfaces thereof having substantially axial symmetry, a plurality of axially-spaced clamps each mounted on one of said members and arranged to engage peripherally the opposed surface of the other member with substantially axial symmetry, displacement means for producing an incremental relative axial change of the surface elements opposed to said clamps, means for actuating said clamps and displacement means in sequence to produce an incremental relative axial movement between said inner and outer members, and a reversible coarse feed mechanism having driving and driven members connected to said inner and outer members to produce relative axial movement therebetween, said coarse feed mechanism being positioned to produce a driving force acting substantially along the axis of said inner member.

4. A precision incremental feed mechanism which comprises relatively movable inner and outer members, said outer member being disposed about said inner member and the contacting surfaces thereof having substantially axial symmetry, a plurality of axially-spaced clamps each mounted on one of said members and arranged to engage peripherally the opposed surface of the other member with substantially axial symmetry, displacement means substantially symmetrically arranged with respect to said axis for producing an incremental relative axial change of the surface elements opposed to said clamps, means for actuating said clamps and displacement means in sequence to produce an incremental relative axial movement between said inner and outer members, and a reversible ball screw coarse feed mechanism having screw and nut members connected to said inner and outer members to produce relative axial movement therebetween, said screw member being arranged substantially coaxial with said inner member.

5. A precision incremental feed mechanism which comprises a tubular inner member, a cooperating outer member encircling said inner member and movable relative thereto in the axial direction, a plurality of axially-spaced clamps each mounted on one of said members and arranged to engage peripherally the opposed surface of the other member with substantially axial symmetry, displacement means substantially symmetrically arranged with respect to said axis for producing an incremental relative axial change of the surface elements opposed to said clamps, means for actuating said clamps and displacement means in sequence to produce an incremental relative axial movement between said inner and outer members, and a reversible ball screw coarse feed mechanism having screw and nut members connected to said inner and outer members to produce relative axial movement therebetween, said screw member being arranged at least partially within said tubular inner member and substantially coaxial therewith.

6. A precision incremental feed mechanism which comprises a cylindrical tubular inner member, a cooperating outer member encircling said inner member and movable relative thereto in the axial direction, a plurality of axially-spaced clamps mounted on said outer member and arranged to engage peripherally the opposed surface areas of said inner member with substantially axial symmetry, displacement means substantially symmetrically arranged with respect to said axis for producing an incremental relative axial change of the surface elements opposed to said clamps, means for actuating said clamps and displacement means in sequence to produce an incremental relative axial movement between said inner and outer members, a reversible ball screw coarse feed mechanism having screw and nut members connected to said inner and outer members to produce relative axial movement therebetween, said screw member being arranged at least partially within said tubular inner member and substantially coaxial therewith, and means for opening and closing said clamps to allow and restrain feeding by said coarse feed mechanism.

7. A precision incremental feed mechanism which comprises a cylindrical tubular inner member, a cooperating outer member encircling said inner member and movable relative thereto in the axial direction, at least a section of one of said members being of magnetostrictive material, a plurality of axially-spaced clamps mounted on said outer member and arranged to engage peripherally the opposed surface areas of said inner member with substantially axial symmetry, a coil arranged to produce magnetostriction in said section of magnetostrictive material to change the relative separation of the surface areas opposed to said clamps, means for actuating said clamps and coil in sequence to produce an incremental relative axial movement between said inner and outer members, a reversible ball screw coarse feed mechanism having screw and nut members connected to said inner and outer members to produce relative axial movement therebetween, said screw member being arranged at least partially within said tubular inner member and substantially coaxial therewith, and means for opening and closing said clamps to allow and restrain feeding by said coarse feed mechanism.

8. A precision incremental feed mechanism which comprises a cylindrical tubular inner member of magnetostrictive material, a cooperating outer member encircling said inner member and movable relative thereto in the axial direction, a plurality of axially-spaced clamps mounted on said outer member and arranged to engage peripherally the opposed surface areas of said inner member with substantially axial symmetry, a coil mounted on said outer member between said clamps and encircling said inner member to produce magnetostriction therein, means for actuating said clamps and coil in sequence to produce an incremental relative axial movement between said inner and outer members, a reversible ball screw coarse feed mechanism having screw and nut members, said screw member being rotatably mounted on said outer member and extending at least partially within said tubular inner member and substantially coaxial therewith, said nut member being attached to said inner member, and means for opening and closing said clamps to allow and restrain feeding by said coarse feed mechanism.

No references cited.